United States Patent [19]
Pierson et al.

[11] 3,940,277
[45] Feb. 24, 1976

[54] GLASS-CERAMICS CONTAINING FIBERS EXHIBITING THERMOPLASTIC PROPERTIES

[75] Inventors: Joseph E. Pierson; Stanley D. Stookey, both of Painted Post, N.Y.

[73] Assignee: Corning Glass Works, Corning, N.Y.

[22] Filed: Aug. 1, 1974

[21] Appl. No.: 493,561

[52] U.S. Cl. ............... 106/39.6; 106/50; 106/39.7
[51] Int. Cl.² .......................................... C03C 3/22
[58] Field of Search ............ 106/39.6, 39.7, 50, 52; 65/33

[56] References Cited
UNITED STATES PATENTS

| 3,445,252 | 5/1969 | MacDowell | 106/39.7 |
| 3,450,546 | 6/1969 | Stong | 106/39.6 |
| 3,464,807 | 9/1969 | Prenau | 106/39.7 |
| 3,498,802 | 3/1970 | Bickford | 106/52 |
| 3,498,803 | 3/1970 | Stookey | 106/52 |
| 3,713,854 | 1/1973 | Bull | 106/39.7 |
| 3,776,809 | 12/1973 | Baumler | 106/39.6 |
| 3,804,608 | 4/1974 | Gaskell | 106/39.7 |

Primary Examiner—Patrick P. Garvin
Assistant Examiner—John F. Niebling
Attorney, Agent, or Firm—Clinton S. Janes, Jr.; Clarence R. Patty, Jr.

[57] ABSTRACT

The present invention relates to the production of glass-ceramic articles having compositions within the alkali silicate field which, because the crystal phase consists essentially of silica fibers, demonstrates exceptional impact resistance. When such articles are subjected to steam hydration at elevated temperatures, toughness with accompanying resilience and thermoplastic behavior will be observed.

17 Claims, No Drawings

GLASS-CERAMICS CONTAINING FIBERS EXHIBITING THERMOPLASTIC PROPERTIES

The manufacture of glass-ceramic articles is discussed in considerable detail in U.S. Pat. No. 2,920,971, the basic patent in the field and reference is made thereto for a more complete explanation. In general, however, a glass-ceramic article is produced through the heat treatment of a glass article and involves three basic steps: First, a glass-forming batch, which most commonly contains a nucleating agent, is melted; Second, the melt is simultaneously cooled and formed into a glass shape of predetermined geometry; and Third, the glass shape is exposed to a defined heat treatment schedule which will lead to the growth in situ of uniform fine-grained crystals homogeneously dispersed and randomly oriented throughout the glass body.

In general, a glass-ceramic article is predominantly crystalline so the physical properties exhibited thereby will normally more closely approximate those of the crystal glass than those of the glassy phase. Furthermore, inasmuch as the crystals have been precipitated in situ from the glass, the article will be nonporous and free of voids and the residual glassy matrix will usually have a far different composition from that of the original or parent glass. The crystal phase present in a glass-ceramic commonly results in the article being mechanically stronger than the parent glass but, like glass, glass-ceramics do not show the plastic flow of metals and fracture occurs before any permanent deformation can take place.

This latter characteristic has formed the foundation for continuing research to achieve the property of toughness in glass-ceramic products. Toughness implies local yielding under high stress to relieve catastrophic stresses and prevent cracking. Many tough materials, such as bamboo or reinforced plastics, are actually two-phase systems, i.e., very often consisting of a fibrous phase possessing relatively high strength and elastic modulus enclosed within a lower-modulus continuous matrix. Insuring a preferred orientation to the fibers can be important in achieving good toughness in the direction of maximum stress in the final product.

U.S. Pat. No. 3,498,803 describes the production of glass and glass-ceramic articles which will exhibit rubber-like properties or the resiliency demonstrated in plastics and rubbers. In broad outline, that patent discloses subjecting certain alkali metal silicate glasses and certain alkali metal silicate glass-ceramic compositions which can also contain BaO in substantial amounts to steam hydration at elevated temperatures, and normally, elevated pressures. Water enters into the structure of the glass (the residual glass of the glass-ceramic bodies) to impart a rubbery character thereto.

The hydrated glass-ceramic articles of that invention did, indeed, exhibit improved resistance to impact, when compared with the original article, because the rubbery character thereof absorbed the force of blows struck thereon. Nevertheless, since the crystals present therein were uniformly fine-grained and radomly oriented, full advantage could not be taken of the intrinsic high strength and elastic modulus of the crystals such as would be possible where the crystals were in the form of fibers and, particularly, where such fibers were oriented in a single direction.

Therefore, the primary objective of the instant invention is to develop glass-ceramic articles wherein the crystal phase thereof consists essentially of silica fibers which act to produce an article of improved impact resistance, and wherein the residual glassy matrix thereof can be hydrated at elevated temperatures to yield articles exhibiting toughness, resiliency, and thermoplasticity at relatively low temperatures.

This objective can be accomplished by converting glass articles consisting essentially, by weight on the oxide basis, of about 75–95% $SiO_2$ and 5–25% $Na_2O$ and/or $K_2O$, to glass-ceramic articles through heat treatment thereof at temperatures ranging between about 775°–1200°C. In general, glass compositions consisting solely of $SiO_2$ + $Na_2O$ and/or $K_2O$ will exhibit poor chemical durability when the $SiO_2$ content is less than about 90%. However, such high $SiO_2$-containing glasses require melting temperatures in excess of those normally desired for commercial practice. Therefore, minor amounts of compatible metal oxides can be useful in securing a more favorable melting temperature and improving the chemical durability of a glass of lower $SiO_2$ content. For example, such useful additions can include $Al_2O_3$, $B_2O_3$, BaO, CaO, $Li_2O$, MgO, SrO, PbO, ZnO, $TiO_2$, and $ZrO_2$. The presence of $B_2O_3$ and/or ZnO in amounts up to 10% by weight appears effective in broadening the composition field wherein $SiO_2$ will constitute the principal crystal phase. Additions of BaO, CaO, $TiO_2$, and $Li_2O$ will normally be held below about 5% by weight since the precipitation of crystals other than $SiO_2$ is hazarded. While exerting a salutary effect upon chemical durability, $Al_2O_3$ seems to inhibit crystallization and, therefore, will commonly be included in amounts less than about 5% by weight. PbO is an especially useful addition inasmuch as, in like manner to $B_2O_3$ and ZnO, it appears to broaden the operable composition area where $SiO_2$ fibers can be obtained and also acts to enhance the chemical durability of the glass, while not seriously damaging the capability of the glassy matrix to be hydrated in steam. Therefore, PbO additions in amounts up to 20% by weight can be employed. However, the total of all additions to the $R_2O$–$SiO_2$ base compositions will be restricted to about 20% since, whereas fibrous silica may be crystallized therefrom, the residual glassy matrix can become too resistant to steam hydration. Furthermore, crystals other than $SiO_2$ and having a morphology other than fibers can result.

With respect to the heat treatment employed to crystallize the glass bodies to glass-ceramic articles containing fibrous silica as the primary crystal phase, temperatures near the eutectic for the alkali silicate glasses, viz., about 775°–800°C., have been determined to constitute a practical minimum. At lower temperatures, other undesirable crystal phases can develop. At temperatures above about 1000°C., there is a progressively lower concentration of crystallized silica with a concomitantly higher siliceous content in the residual glass. This latter factor results in a residual glass of greater chemical durability but also impairs its ability to be hydrated in steam. Hence, the maximum heat treating temperature has been deemed to be about 1200°C.

It can be appreciated that the rate of crystallization is temperature-dependent. Thus, at the cooler extreme of the crystallization range, longer exposure periods will be required than at the hotter end. Commonly, crystal growth commences at the surface of the article and proceeds perpendicularly inward. By maintaining a temperature gradient during the crystallization process, the fibers can be made to grow parallel to a surface. The time demanded for complete crystallization is a function of the linear crystal growth rate and the largest thickness dimension of the glass article. In general, heat treating times between about 2–72 hours have proved useful.

It has been learned that transparent, crystallized articles can be produced through control of the base glass composition and the heat treatment applied thereto. Hence, a close match in refractive index can be achieved between the silica crystals (e.g., cristobalite, $n_D = 1.48$) and the residual glassy matrix. Such can also be the case where the glassy matrix has been steam hydrated.

In general, crystal growth beginning at a surface and growing into the glass body is preferable to growth commencing with internal nucleation. In both modes, each crystal will grow indefinitely until it collides with the other crystals or the heat treatment stops. Internal nucleation results in producing spherulites with interleaved residual glass. Where many nuclei are present, lateral growth of fibers is quickly stopped by contact with adjacent crystals. Of course, limited internal nucleation can be useful where relatively short fiber lengths and random orientation of the fibers are desired. The presence of $B_2O_3$ appears to reduce or prevent the development of internal nuclei.

The crystallization of the silica fibers in situ leaves a residual glass which is higher in alkali metal ion content and all constituents other than $SiO_2$ than what were present in the parent glass body. This circumstance renders that residual glassy matrix quite amenable to steam hydration whereas the silica fibers, themselves, and, sometimes, the parent glass are not. The process of steam hydration contemplates the three parameters: temperature, pressure, and concentration of steam. Normally, hydration proceeds more rapidly at higher temperatures and pressures. Therefore, temperatures greater than 100°C. and up to about the deformation point of the material can be used successfully.

The pressures involved in the simple steam-air atmosphere can be calculated from the temperature and concentration of steam in the environment. The expression relative humidity is normally employed in describing water-containing atmospheres. However, that expression is intrinsically limited in that the definition of relative humidty envisages a level of saturated vapor pressure. But, there is a maximum temperature at which any gas can be liquified, this temperature being denominated the critical temperature. As a necessary corollary, there is the critical pressure required to liquefy a gas at its critical temperature. For water, the critical temperature is about 374°C. and the critical pressure about 3200 psi. At temperatures above the critical temperature, $H_2O$ has been delineated a fluid which is not considered to be either a liquid or a gas.

However, the behavior of a $H_2O$-containing environment at temperatures above 374°C. can be reasonably extrapolated from that of an atmosphere of a certain relative humidty below the critical temperature with the aid of standard steam tables and an understanding of filling factors such as is set out in "Hydrothermal Crystal Growth", R. A. Laudise and J. W. Nielsen, *Solid State Physics*, 12, pp. 181–182, Academic Press, New York, 1961.

Hydration also proceeds more rapidly where a saturated steam atmosphere is utilized. Therefore, in the preferred practice of the invention, a temperature of at least 120°C. and saturated steam pressure of at least about 25 psig will be employed, with 400°C. being deemed a practical maximum top temperature.

The use of a 100% relative humidity atmosphere, as in the preferred embodiment of the invention described above, will not only yield the most rapid rate of hydration but also will cause the glass to absorb the maximum amount of $H_2O$ in the shortest possible time. In certain instances, e.g., to provide a more chemically durable residual glassy matrix, less than the maximum water absorption may be preferable. In such cases, a two-step hydration-dehydration process such as is described in U.S. application serial No. 445,453 now U.S. Pat. No. 3,912,481, filed Feb. 25, 1974, may be employed, or a one-step hydration step in low relative humidity environments, such as is disclosed in U.S. application Ser. No. 445,454, also filed Feb. 25, 1974, may be utilized.

The time demanded for the complete hydration is obviously a function of temperature, pressure, relative humidity, glass composition, and the thickness dimension of a particular body. Hence, the time can vary from as little as a few minutes to several days. From a commercial point of view with bodies of substantial thickness dimensions, hydration times of about 2–24 hours have been deemed practical.

Table I records a group of glass compositions, expressed in weight percent on the oxide basis, which have been found operable in the present invention. The batches therefor can be compounded from any materials, either the oxides or other compounds, which, when melted together, will be converted to the desired oxide composition in the proper proportions. The batch ingredients were thoroughly blended together, normally in a ball mill to aid in securing a homogeneous melt, and then melted in open platinum or platinum-rhodium crucibles for about four hours at 1550°–1750°C. Larger melts can, of course, be made in pots or continuous melting tanks in accordance with conventional commercial glassmaking practice. The crucible melts were poured onto a steel plate, hand-pressed into squares about 5 × 5 × ½–1 inches thick, and the squares transferred to an annealer operating at 650°C.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 94 | 86 | 90 | 91 | 88 | 89 | 79.6 | 90 | 85 | 81 | 85 | 88 | 75 |
| $Na_2O$ | 6 | 14 | 10 | 6 | 8 | 8 | 7.3 | 6 | 10 | 5 | 12 | 10 | 3 |
| MgO | — | — | — | 2 | — | — | — | 2 | — | — | — | — | — |
| $Fe_2O_3$ | — | — | — | 1 | — | — | — | — | — | — | — | — | — |
| $B_2O_3$ | — | — | — | — | 4 | — | — | 2 | 5 | — | — | — | — |
| BaO | — | — | — | — | — | 3 | — | — | — | — | — | — | — |
| ZnO | — | — | — | — | — | — | 2 | — | — | — | — | — | — |
| PbO | — | — | — | — | — | — | — | — | — | 9 | — | — | 12.5 |
| $K_2O$ | — | — | — | — | — | — | — | — | — | 5 | — | — | 9 |
| $TiO_2$ | — | — | — | — | — | — | — | — | — | — | 3 | — | — |

TABLE I-continued

| | 1 | 2 | 3 | 4 | 5 | 6 | 7 | 8 | 9 | 10 | 11 | 12 | 13 |
|---|---|---|---|---|---|---|---|---|---|---|---|---|---|
| Al₂O₃ | — | — | — | — | — | — | — | — | — | — | — | 2 | — |

| | 14 | 15 | 16 | 17 | 18 | 19 | 20 | 21 | 22 | 23 | 24 | 25 | 26 |
|---|---|---|---|---|---|---|---|---|---|---|---|---|---|
| SiO₂ | 75 | 70 | 75 | 92 | 93 | 94 | 88 | 88 | 88 | 90 | 90 | 90 | 90 |
| Na₂O | 3 | 15 | 12.5 | 4 | 3.5 | 3 | 5 | 4.5 | 4 | 7 | 7 | 4.5 | 4 |
| ZnO | — | — | — | — | — | — | 2 | 3 | 4 | 1 | 3 | 1 | 2 |
| PbO | 15 | 15 | 12.5 | — | — | — | — | — | — | 1 | — | — | — |
| K₂O | 7 | — | — | 4 | 3.5 | 3 | 5 | 4.5 | 4 | — | — | 4.0 | 4 |
| Al₂O₃ | — | — | — | — | — | — | — | — | — | 1 | — | — | — |

After annealing, the glass squares were transferred to an electrically-fired furnace and heated to the temperatures reported in Table II and held at those temperatures for the periods of time also recorded in that table. The squares were heated at furnace rate, viz., 30°C./minute, and were cooled to room temperature by simply cutting off the power to the furnace and allowing it to cool at its own rate with the slabs retained therein. Their cooling rate was estimated to average about 3°–5°C./minute. A visual description of crystal morphology is also presented in Table II, involving an examination of the square surface and an interior cross section obtained by breaking the slab into two pieces.

nucleus is in the interior of the glass body, gives rise to spherulities with interleaved residual glass. However, with surface nucleation which is the preferred mechanism, lateral growth is quickly stopped by contact with crystals growing from the adjacent nuclei leading to the development of long needles growing perpendicularly to the surface. And, as has been observed earlier, methods of restricting crystal growth to a single direction are known, e.g., their growth in a temperature gradient. The needles, themselves, appear to average about three microns in diameter.

Study has shown that, by controlling the glass composition and temperature of growth, the maximum con-

TABLE II

| Example No. | Heat Treatment Schedule | Visual Description |
|---|---|---|
| 1 | 900°C. for 16 hours | SiO₂ fibers extending about 3/8" from surface into square |
| 4 | 900°C. for 16 hours | SiO₂ fibers extending about 1/16" from surface into square — internal nucleation to give fine-grained crystals |
| 5 | 800°C. for 16 hours | SiO₂ fibers extending about 1/32" from surface into square — internal nucleation also to give fine-grained cyrstals |
| 6 | 900°C. for 16 hours | SiO₂ fibers extending from surface through square |
| 7 | 900°C. for 16 hours | SiO₂ fibers extending from surface through square |
| 8 | 900°C. for 16 hours | SiO₂ fibers extending about 1/4" from surface into square |
| 9 | 900°C. for 16 hours | SiO₂ fibers and internal nucleation to give fine-grained crystals — crystallized through square |
| 10 | 800°C. for 16 hours | SiO₂ fibers extending about 1/8" from surface into square |
| 11 | 900°C. for 16 hours | SiO₂ fibers and internal nucleation to give fine-grained crystals — crystallized through square |
| 12 | 900°C. for 16 hours | SiO₂ fibers extending about 3/8" from surface into square |
| 13 | 800°C. for 16 hours | SiO₂ fibers and internal nucleation to give fine-grained crystals — crystallized through square |
| 14 | 800°C. for 16 hours | SiO₂ fibers extending about 1/16" from surface into square |
| 15 | 800°C. for 16 hours | SiO₂ fibers extending from surface almost through square |
| 16 | 800°C. for 16 hours | SiO₂ fibers extending about 1/8" from surface — internal nucleation also to give fine-grained crystals |
| 17 | 800°C. for 70 hours | SiO₂ fibers extending from surface through square |
| 17 | 800°C. for 16 hours | SiO₂ fibers extending about 1/16" from surface — internal nucleation also to give fine-grained crystals |
| 18 | 800°C. for 70 hours | SiO₂ fibers extending about 1/16" from surface — internal nucleation also to give fine-grained crystals |
| 19 | 800°C. for 16 hours | SiO₂ fibers extending about 1/16" from surface — internal nucleation also to give fine-grained crystals |
| 19 | 800°C. for 70 hours | SiO₂ fibers extending from surface through square |
| 20 | 900°C. for 16 hours and then 1200°C. for 60 hours | translucent; crystallized mass |
| 21 | 1200°C. for 60 hours | translucent; crystallized mass |
| 21 | 900°C. for 16 hours and then 1200°C. for 60 hours | translucent; crystallized mass |
| 22 | 1200°C. for 60 hours | translucent; crystallized mass |
| 22 | 900°C. for 16 hours and then 1200°C. for 60 hours | |
| 23 | 1200°C. for 16 hours | translucent; SiO₂ fibers extending from surface through square |
| 24 | 900°C. for 16 hours and then 1200°C. for 16 hours | SiO₂ fibers extending from surface through square |
| 25 | 800°C. for 66 hours | 1/32" fibrous surface layer; translucent |
| 26 | 800°C. for 66 hours | 1/32" fibrous surface layer; translucent |

Examination of the fibers via X-ray diffraction analysis has identified them as being predominantly cristobalite. The growth habit of the crystals appears to encourage the development of needles. As was explained above, the needles seem to begin at a nucleus and grow at about equal rates in all directions which, when the centration of silica crystals that will precipitate out can be predetermined. Hence, the crystal content can comprise up to at least 80% of the body.

Example 1, when crystallization to completion at 900°C., formed a residual glassy phase analyzed to contain about 77% SiO₂ and 23% Na₂O. Applying the Lever Rule and the phase diagram, the calculated concentration of silica crystals is 74% by weight with the residual glass constituting 26% by weight.

The Lever Rule is a useful tool in calculating concentrations of crystalline silica and glass in a two-component member of the glass-ceramic bodies encompassed within the instant invention. Hence, when glass of a given composition separates into only two phases, the given composition and those of the two phases are colinear. Furthermore, the amounts of the two phases are inversely proportional to their distances from the given composition. Therefore, in the explanation below, $A$ and $B$ depict the compositions of two phases formed from composition $C$. It follows, then, that the amount of $A \times$ length $AC =$ amount of $B \times$ length $BC$ or $A/B = BC/AC$.

From FIGS. 167 and 192 of *Phase Diagrams for Ceramists*, Levin, Robbins, and McMurdie, The American Ceramic Society, 1964, it is apparent that high silica, alkali silicate glasses, heated at 800°C. until crystallization is complete, will separate into two phases; viz., crystalline silica and a glass containing about 75% by weight $SiO_2$ and 25% by weight $Na_2O$ or $K_2O$. Such glasses readily lend themselves to use of the Lever Rule to predict the maximum amounts of crystalline silica that will be present in the residual glassy matrix when the composition of the percent homogeneous glass is known.

Table III lists approximate calculated amounts of silica crystals in various completely devitrifed $R_2O$—$SiO_2$ glasses devitrified at 800°C.

TABLE III

| Weight % $SiO_2$ in Parent Glass | Weight % $SiO_2$ Crystals in Devitrified Glass |
|---|---|
| 100 | 100 |
| 95 | 80 |
| 90 | 60 |
| 85 | 40 |
| 80 | 20 |
| 75 | 0 |

It must be appreciated that this calculation assumes a simple $R_2O$-$SiO_2$ glass and that the presence of a third component modifier oxide can substantially increase the amount of silica crystallization developed. This point is illustrated in *Phase Diagrams for Ceramists*, supra, with FIGS. 405–406 for $SiO_2$—$Na_2O$—$ZnO$, FIG. 515 for $SiO_2$—$Na_2O$—$B_2O_3$, and FIG. 494 for $SiO_2$—$Na_2O$—$PbO$.

Whereas the heat treatment schedules recited in Table II contemplated annealed glass samples, and the annealing to room temperature provides two advantages, viz., it permits visual inspection of glass quality and the resulting fibrous crystals appear to be of a more uniform size, that step is not actually necessary for the successful operation of the invention. Thus, it is possible to merely form the melt into a glass shape and immediately expose the glass shape to the crystallization heat treatment. Such practice has the advantages of speed and fuel economy. A melt of Example 1 was made in a silica crucible and the crucible containing the liquid melt was transferred directly to a furnace operating at 800°C. and retained therein overnight. After cooling to room temperature and removing the body from the crucible, silica fibers were observed which had grown from the top surface and also from the glass-crucible interface. Hence, no cooling cycle as such is demanded for crystal growth.

After the crystallization step, the articles were subjected to a steam atmosphere in an autoclave. Although not mandatory for the successful operation of the invention, an autoclave provides ready control of steam pressure, relative humidity, and temperature and, therefore, is especially useful in determining the operable parameters of those factors. The crystallized slabs were point supported above the base plate of the autoclave on refractory of TEFLON or other non-adhering and non-reactive material. In some instances, the crystallized slabs were crushed and the resulting granules hydrated. The autoclave was sealed and heated to generate steam at a desired temperature and pressure. Steady state operation of the autoclave was normally attained in about one-half hour, although a longer period can be required at very high operating temperatures. As has been discussed above, a saturated steam atmosphere was employed in the following examples, although such may not be required, and lower relative humidities can be achieved by control of the filling factor, i.e., the amount of water placed in the autoclave. In general, the use of relative humidities less than about 10% results in a hydration reaction which is so slow as to approach impracticality.

In the following description, a commercially-marketed autoclave was employed having a capacity of one cubic foot. Steam pressure was generated by heating distilled water placed in the bottom of the vessel. The pressure was regulated by varying the temperature. The desired humidity therein was obtained by predetermining the amount of water needed for that humidity at a particular temperature. To assure reproducible results, the autoclave was thoroughly dried before each run.

It is obvious that, for finely-divided particles and thin-walled articles, relatively short times will be required for complete hydration, whereas much longer times will be demanded for bodies of greater bulk. Also, in the case of granules, hydration can result in flow thereof to yield an agglomerate. In the following examples, the slabs were retained within the autoclave at temperature for about 16–24 hours. After hydration, the autoclave was permitted to cool below 100°C. before removal of the samples. Withdrawal of the samples at elevated temperatures can be undertaken if the water is removed from the autoclave. The water content absorbed by the residual glassy matrix is determined by measuring the weight of the slab before and after hydration or by determining weight loss upon calcination. Although in the examples recorded in Table IV air constituted that part of the atmosphere other than steam, it will be recognized that various inert gases such as helium, argon, and nitrogen can be introduced.

Table IV reporst various hydration treatments carried out on the glass-ceramic slabs recited in Table II. Inasmuch as temperatures below the critical temperature (374°C.) were used, an atmosphere of 100% relative humidity was maintained in each run.

TABLE IV

| Example No. | Hydration Treatment Temperature | Pressure | Time | % H₂O Absorbed | | Description |
|---|---|---|---|---|---|---|
| 1 | 200°C. | 220 psi | 16 hours | 7 | 1/8" | translucent surface layer |
| 2 | 150°C. | 56 psi | 16 hours | 22 | 3/16" | translucent surface layer |
| 3 | 150°C. | 56 psi | 16 hours | 10 | 3/16" | translucent surface layer |
| 4 | 200°C. | 220 psi | 16 hours | 15 | 5/8" | translucent surface layer |
| 6 | 150°C. | 56 psi | 16 hours | 21 | 1/8" | translucent surface layer |
| 7 | 150°C. | 56 psi | 16 hours | | 1/16" | translucent surface layer |
| 8 | 120°C. | 18 psi | 16 hours | 22 | | opaque throughout |
| 9 | 200°C. | 220 psi | 16 hours | 27 | 1/16" | translucent surface layer |
| 10 | 200°C. | 220 psi | 16 hours | 14 | 1/8" | translucent surface layer |
| 11 | 250°C. | 576 psi | 16 hours | | 1/8" | translucent surface layer |
| 12 | 180°C. | 145 psi | 16 hours | 32 | 1/8" | translucent surface layer |
| 13 | 200°C. | 220 psi | 16 hours | 26 | 1/4" | translucent surface layer |
| 14 | 200° C. | 220 psi | 16 hours | 13 | 1/8" | translucent surface layer |
| 15 | 200°C. | 220 psi | 16 hours | 28 | 1/8" | translucent surface layer |
| 16 | 200°C. | 220 psi | 16 hours | 29 | 1/4" | transparent surface layer |
| 17 | 200°C. | 220 psi | 16 hours | 13 | 1/8" | translucent surface layer |
| 18 | 200°C. | 220 psi | 16 hours | 15 | 1/8" | translucent surface layer |
| 19 | 200°C. | 220 psi | 16 hours | 8 | 1/8" | translucent surface layer |
| 20 | 250°C. | 576 psi | 16 hours | 24.8 | 3/8" | transparent surface layer |
| 21 | 250°C. | 576 psi | 16 hours | | 1/8" | transparent surface layer |
| 21 | 250°C. | 576 psi | 16 hours | 20.8 | 3/16" | transparent surface layer |
| 22 | 250°C. | 576 psi | 16 hours | | 1/16" | translucent surface layer |
| 22 | 250°C. | 576 psi | 16 hours | 18.9 | 1/8" | Some flow; transparent surface layer |
| 23 | 200°C. | 220 psi | 16 hours | 16 | | translucent throughout |
| 24 | 150°C. | 56 psi | 16 hours | 11 | | translucent throughout |
| 25 | 300°C. | 1245 psi | 16 hours | 11.7 | 1/8" | translucent surface layer |
| 26 | 300°C. | 1245 psi | 16 hours | 8.7 | 1/16" | translucent surface layer |

Visual observations of broken cross sections have been useful in determining the degree and depth of hydration. Whereas the anhydrous glass-ceramic generally appeared definitely translucent or opaque, the hydrated layer took on a more nearly transparent appearance than the unreacted portion. Hence, the refractive index of the hydrated glass more nearly approached that of the silica fibers than that of the unhydrated glass. The hydrated body demonstrated some resilience, some rubbery character, and became thermoplastic at slightly elevated temperatures.

Table V records several compositions, expressed in parts by weight on the oxide basis, which can be made to exhibit excellent transparency after controlled crystallization and hydration treatments.

The relative ease of thermoplastic forming decreases with increasing concentration of silica fibers and with decreasing water concentration in the hydrated glass phase. Nevertheless, the reinforcing effect imparted by the fibers is enhanced with greater amounts of fibers and the chemical durability of the products is much improved where the water content in the glassy phase is maintained below about 10%. In essence, sufficient amount of water must be absorbed by the glass to be effective in imparting thermoplastic behavior to the articles. Practical considerations dictate the optimum for the purpose intended.

Althuogh those glass-ceramic articles containing very high water contents can be pressed or otherwise formed into shapes at temperatures no more than about

TABLE V

| | 27 | 28 | 29 | 30 | 31 | 32 | 33 | 34 | 35 |
|---|---|---|---|---|---|---|---|---|---|
| SiO₂ | 86 | 90 | 80 | 85 | 77.5 | 85 | 90 | 91 | 88 |
| Na₂O | 9 | 7 | 10 | 7.5 | 10 | — | 7 | 7 | 7 |
| ZnO | 5 | 3 | — | — | — | — | 1 | — | — |
| PbO | — | — | 10 | 7.5 | 12.5 | 10 | 1 | — | — |
| K₂O | — | — | — | — | — | 5 | — | — | — |
| Al₂O₃ | — | — | — | — | — | — | 1 | — | — |
| B₂O₃ | — | — | — | — | — | — | — | 2 | 5 |
| Cr₂O₃ | 0.1 | 0.1 | 0.1 | 0.1 | — | — | — | — | — |

In general, the greater the concentration of alkali metal oxide in the residual glassy matrix, the greater the amount of water which will be absorbed by the glass. And, in particular with the sample R₂O—SiO₂ glasses, the greater the concentration of alkali metal oxide in the residual glassy matrix, the poorer will be the chemical durability thereof. Water contents up to 35% have been measured in certain residual glasses of high R₂O content, but such glasses exhibit very poor durability. The presence of third component modifier ions can not only improve the chemical durability of the parent anhydrous glass but can also reduce the amount of water which will be taken up by the glass during the hydration process. This latter factor will also provide an improvement in chemical durability.

100°C., more homogeneous products can be produced where higher temperatures are employed, e.g., up to about 400°C., to secure better flow in the hydrated material. This improved flow also leads to more complete orientation of the fibers in the direction of stress. Hence, the usual orientation of the fibers perpendicular to the body surface can be redirected through hot rolling, hot pressing, etc. For articles of the highest silica content and lowest water concentration, a temperature as high as 500°C. may be demanded. However, such temperatures are below the softening points of the parent anhydrous glass.

Since some volatilization of the absorbed water can take place during the forming operation because of the elevated temperatures employed, shaping of the thermoplastic articles within an autoclave or other pressurized system may advantageously be undertaken. Various atomspheres may also be utilized at suitable pressures to inhibit volatilization of water.

Whereas hydrated bodies of substantial bulk can be pressed at slightly elevated temperatures into shapes of different geometries, forming convenience customarily contemplates the use of relatively small-sized pieces or granules as starting materials. For example, the hydrated squares of the examples reported in Table IV were coarsely crushed into pieces somewhat larger than would pass a No. 10 United States Standard Sieve (2 mm.) and those pieces placed into a 1-¼ inch diameter steel mold which had been preheated to 200°–250°C. While maintaining that temperature, a load ranging between about 5000–10,000 psi was applied thereto. After holding about three minutes, the heat source was removed and the mold permitted to cool to room temperature. The load was released and a circular disc ¼ inch in thickness withdrawn from the mold. The discs approached transparency and were essentially free of any inhomogeneity except, of course, the fibrous crystal phase.

Table VI records the results of impact tests applied to Examples 2 and 3 Table IV and a comparison made between those discs and other discs pressed in like manner from hydrated granules of a glass having the composition of 76% $SiO_2$ and 24% $Na_2O$, both being in weight percent. That glass approximates the composition of the residual glassy matrix of the glass-ceramic bodies of Examples 2 and 3. The test comprised dropping a 1 inch steel ball, weighing 0.145 lbs., from various heights onto 1-¼ inch discs having a thickness of about ¼ inch. The energy of the fall was calculated from the height in terms of foot pounds. Each value reported represents the results of survival of 6 or 7 samples per test.

TABLE VI

| Example No. | % Above 0.075 ft. lbs. | % Above 0.145 ft. lbs. | % Above 0.29 ft. lbs. | % Above 0.725 ft. lbs. | % Above 1.09 ft. lbs. | % Above 1.45 ft. lbs. | Number of Pieces After Fracture |
|---|---|---|---|---|---|---|---|
| 2 | 100 | 100 | 100 | 83 | 17 | 0 | 2–3 |
| 3 | 100 | 100 | 100 | 72 | 14 | 0 | 2–3 |
| Glass | 67 | 17 | 0 | 0 | 0 | 0 | 2–3 |

The improvement in toughness and impact resistance provided by the silica fibers is believed to be self-evident from the table.

We claim:

1. A glass-ceramic body exhibiting exceptional impact resistance consisting essentially of crystalline silica fibers contained within a residual glassy matrix, said fibers having a needlelike structure and being oriented in essentially a single direction, and said glass-ceramic body consisting essentially, by weight, of about 75–95% $SiO_2$ and 5–25% $Na_2O$ and/or $K_2O$.

2. A glass-ceramic body according to claim 1 wherein said glass-ceramic body also contains up to 20% by weight total of at least one oxide in the indicated proportions selected from the group consisting of up to 5% $Al_2O_3$, CaO, $Li_2O$, and/or $TiO_2$, up to 10% BaO, SrO, $B_2O_3$, MgO, and/or ZnO, and up to 20% PbO.

3. A method for making a glass-ceramic body consisting essentially of crystalline silica fibers contained within a residual glassy matrix and exhibiting exceptional impact resistance, said fibers having a needle-like structure and being oriented in essentially a single direction, which comprises:
   melting a batch for a glass consisting essentially, by weight, of about 5–25% $Na_2O$ and/or $K_2O$ and 75–95% $SiO_2$;
   b. simultaneously cooling and shaping a glass body therefrom; and
   c. exposing said glass body to a temperature between about 775°–1200°C. for a sufficient length of time to cause the crystallization of silica fibers therein, thereby making a glass-ceramic body consisting essentially of crystalline silica fibers contained in a residual glassy matrix.

4. A method according to claim 3 wherein said glass also contains up to 20% by weight total of at least one oxide in the indicated proportions selected from the group consisting of up to 5% $Al_2O_3$, CaO, $Li_2O$, and/or $TiO_2$, up to 10% BaO, MgO, SrO, $B_2O_3$, and/or ZnO, and up to 20% PbO.

5. A method according to claim 3 wherein said glass body is exposed to a temperature between about 775°–1200°C. for about 2–74 hours.

6. A glass-ceramic body exhibiting toughness and thermoplastic properties consisting essentially of crystalline silica fibers contained within a residual glassy matrix, said fibers having a needle-like structure and being oriented in essentially a single direction, wherein said glass-ceramic body has an amount of water absorbed therein effective to impart thermoplastic properties thereto, said glass-ceramic body consisting essentially, by weight on the oxide basis, exclusive of water contained within its volume, of about 75–95% $SiO_2$ and 5–25% $Na_2O$ and/or $K_2O$.

7. A glass-ceramic body according to claim 6 wherein the amount of water absorbed in said residual glassy matrix ranges up to about 35% by weight thereof.

8. A glass-ceramic body according to claim 6 wherein the amount of water absorbed in said residual glassy matrix does not exceed about 10% by weight thereof.

9. A glass-ceramic body according to claim 6 wherein said glass-ceramic body also contains up to 20% by weight total of at least one oxide in the indicated proportions selected from the group consisting of up to 5% $Al_2O_3$, CaO, $Li_2O$, and/or $TiO_2$, up to 10% BaO, MgO, SrO, $B_2O_3$, and/or ZnO, and up to 20% PbO.

10. A method for making a glass-ceramic body consisting essentially of crystalline silica fibers contained within a residual glassy matrix and exhibiting toughness and thermoplastic properties, said fibers having a needle-like structure and being oriented in essentially a single direction, which comprises:
   a. melting a batch for a glass consisting essentially, by weight on the oxide basis, of about 5–25% $Na_2O$ and/or $K_2O$ and 75–95% $SiO_2$;
   b. simultaneously cooling and shaping a glass body therefrom;
   c. exposing said glass body to a temperature between about 775°–1200°C. for a sufficient length of time to cause the crystallization of silica fibers therein, thereby making a glass-ceramic body consisting essentially of crystalline silica fibers contained within a residual glassy matrix; and d. subjecting said glass-ceramic body to a $H_2O$-containing environment of at least 10% relative humidity at a temperature greater than 100°C. for a sufficient length of time to cause an amount of water to be absorbed by said residual glassy matrix in at least a surface portion of said glass-ceramic article effective to impart thermoplastic properties thereto.

11. A method according to claim 10 wherein said glass also contains up to 20% by weight total of at least one oxide in the indicated proportions selected from the group consisting of up to 5% $Al_2O_3$, CaO, $Li_2O$, and/or $TiO_2$, up to 10% BaO, MgO, SrO, $B_2O_3$, and/or ZnO, and up to 20% PbO.

12. A method according to claim 10 wherein said glass body is exposed to a temperature between about 775°–1200°C. for about 2–72 hours.

13. A method according to claim 10 wherein said glass-ceramic body is subjected to a 100% relative humidity environment.

14. A method according to claim 10 wherein said glass-ceramic body is subjected to a $H_2O$-containing environment at temperatures ranging from about 100°C. up to about the deformation point of the body.

15. A method according to claim 10 wherein said glass-ceramic body is subjected to a $H_2O$-containing environment for about 2–24 hours.

16. A method for forming shapes from the hydrated glass-ceramic body made in accordance with claim 10 exhibiting thermoplastic properties which comprises the steps of:

a. forming said body to a shape of a desired configuration under pressure and at a temperature ranging between about 100°–500°C.; and, thereafter, b. bringing said shape to room temperature and pressure.

17. A method according to claim 16 wherein said shape is formed at temperatures between about 100°–400°C.

* * * * *